Sept. 27, 1932.  M. SCHLEICHER  1,879,887
APPARATUS FOR THE SUPERVISION OF ELECTRIC POWER DISTRIBUTING SYSTEMS
Filed March 20, 1929
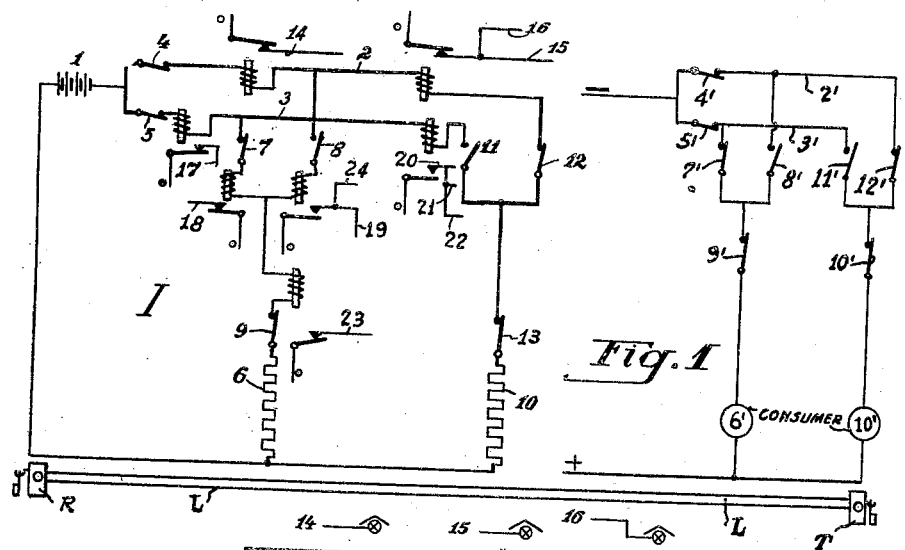
Fig. 1
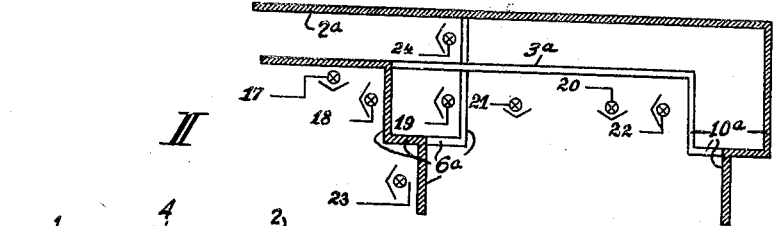
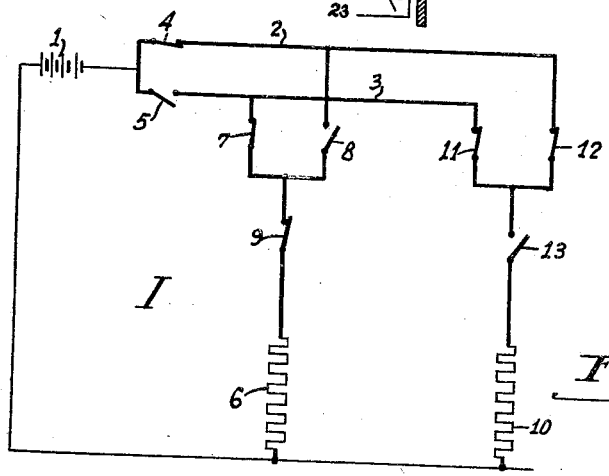
Fig. 2
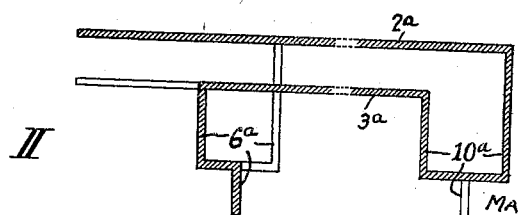
INVENTOR
MANFRED SCHLEICHER
BY
ATTORNEYS.

Patented Sept. 27, 1932

1,879,887

UNITED STATES PATENT OFFICE

MANFRED SCHLEICHER, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

APPARATUS FOR THE SUPERVISION OF ELECTRIC POWER DISTRIBUTING SYSTEMS

Application filed March 20, 1929, Serial No. 348,439, and in Germany January 10, 1928.

For the purpose of supervising an electrical power distributing system it has been proposed to put up at the supervising point a representation of the system the several parts of which may be shown by indicating apparatuses. Each of these apparatuses indicates the part of the representation allotted thereto, for example, when the corresponding individual part of the system itself is under potential. By this means, however, the best supervision is not in all cases attained. There are cases in which it is preferable for supervising purposes, to be able to see at a glance in which way the power is supplied to the users. It has therefore already been proposed that the indicating apparatuses should be also capable of indicating those several parts which correspond to the energy conducting parts of the system. Each indicating apparatus would then have to operate when the corresponding line of the system was carrying energy. This has, however, again the disadvantage that the indication would not take place if the user is for any reason taking no energy. The purpose of the supervision is, however, in most cases not to ascertain the taking of the energy but to observe generally the way in which the energy is carried during the time that it is being taken.

According to the invention, therefore, two representations of the distributing system are provided, of which the first consists of electrical conductors and, corresponding to the distributing system, is provided with a source of current, switches, and a spare resistance representing the resistance of the mains, while the line tracings of the second representation are provided with the indicating apparatuses. The combined working of the two representations is a specially important feature of the invention and is carried out in such a manner that the indicating apparatus of the second representation come into operation when the corresponding lengths of line of the first representation are carrying current.

An example of carrying out the invention is shown in Figures 1 and 2 of the accompanying drawing with different conditions of working. The first representation is indicated by I, and the second representation by II. The power distributing system is shown only in Fig. 1, its arrangement being reproduced in the representation I, and the parts of said distributing system are designated by the same reference numerals, with the addition of a prime, as the corresponding parts of representation I. The description of this representation will therefore also explain the distributing system. A source of current 1 feeds two supply lines 2 and 3 with energy through switches 4 and 5. A consumer 6, which in the representation I is an ohmic resistance, can be connected through a switch 7 with the supply line 3 and through a switch 8 with the supply line 2. By means of a switch 9 it can be cut out altogether. A second consumer 10 is connected in exactly the same way through the switches 11, 12 and 13 with the two supply lines.

By any suitable manner it is arranged that the switches of the representation I always have the same position as the corresponding oil or cut-out switches of the power distributing system itself. The position of the switches of said system may be communicated by telephone (see the transmitter T, line L and receiver R in Fig. 1) or otherwise to the supervising station and the supervising attendant then throws the switches of the representation I in or out by hand according to the communication received. The switches of the representation may, however, also be so connected with the switches of the system by controlling devices or by a long distance service installation, that the switches of the representation are automatically carried into the correct position, when the switches of the system alter their position.

In the conditions of working shown in Fig. 1, the switches 4, 5, 7, 9, 12 and 13 are closed, the switches 8 and 11, on the contrary, are open. It will thus be seen that the consumer 6 obtains energy through the supply line 3 and the consumer 10 obtains energy through the supply line 2.

The representation II consists of line markings which can be lit by means of electric lamps for indicating purposes. The reflectors indicate which parts are to be lit by these lamps. Each lamp has two supply lines, of which one is shown and leads to relay switches of the representation I. The second supply line is omitted for the sake of clearness and leads to one pole of a source of lighting current, not shown. In the line tracings of the represenation I are situated relay windings which, as soon as they are traversed by a current, close the relay switches shown adjacent thereto. There are two such relays in the supply line 2. The pivots of their switches lead through connecting lines O to the second pole of the source of lighting current. From the closed switch contact of the first relay a line 14 runs to the corresponding lamp in the representation II to illuminate the line marking $2^a$ which represents the supply line 2. For the sake of clearness only the beginning and the end of this connecting line are shown. The reference figures 14 designate the connection. From the switch contact of the second relay of the supply line 2, the lines 15 and 16 run to the corresponding lamps. In the same way the representation $3^a$ of the supply line 3 is lit by lamps to which the current is conducted through the lines 17, 20 and 21. The line markings $6^a$ representing the branches for the consumer 6 are lit by lamps which receive their current through the line 18, 19, 24 and 23. The lamps for the line markings $10^a$ representing supply lines to the consumer 10 are arranged in exactly the same way and are not therefore shown in their entirety. Only one lamp is shown for these supply lines, and it is controlled by the second relay in the supply line 3. It receives its current through the line 22.

The illuminated stretches of the representation II in the condition of working under consideration are shown by full black lines, while the dark stretches are indicated by a double line. The example shows that the flow of energy is very easily seen from the complete representation. Under certain circumstances, therefore, it is even unnecessary to indicate in the representation II the situation of the switches and their position at the moment. In many cases, however, this may be desired and can be carried out in any suitable manner. In the drawing the switches are not shown in the representation II simply for the sake of clearness.

Figure 2 shows the same two representations, but in a different condition of working which can be seen from the position of the switches in representation I. The representation II here also shows clearly the flow of the energy.

The resistances 6 and 10 may be as small as desired; it will, however, be generally advisable to make them of a size in proportion to the resistance of the relay windings.

The use, for the purposes of supervision, of two representations of the energy distribution system is in itself known. With known arrangements of this kind, however, the stretches of line are indicated when they are under potential. In the example shown this would have as a consequence, in Figure 1 as well as in Figure 2, that all the stretches of line are lit up. The condition of working would, however, in no way be shown by the lighting, or other means of indication provided, alone, and could only be followed from the position of the switches. The showing of the switches in the second representation would therefore be quite indispensable. Furthermore, the supervision would be considerably less efficient. That all the parts in the power distribution system both in the condition of working according to Figure 1 and according to Figure 2, are under potential is clearly seen from the fact that those line tracings, in which there is an open switch, are under potential on the one side from the source of current, and on the other side from the consumer.

The apparatus according to the invention will in general be of advantage for all those distributing systems in which a stretch of line is not cut out by a switch at both ends, but is interrupted only by a single switch, in so far as it is not a question of simple branch lines without ring connections or interconnections.

The apparatus shown is, for example, very suitable for use in connection with electric railways. It is there important that the indication on representation II still remains when by chance no train is taking current from the stretch supplied, and thus the supply lines and branches of the energy distributing system itself carry no current.

Having now particularly described and ascertained the nature of the said invention and in what manner the same is to be performed, I declare that what I claim is:—

1. Apparatus for the supervision of electric power distributing systems, comprising a first representation of such system, said representation comprising a source of electricity, electric conductors connected therewith, switches connected with said conductors, the relative arrangement of said conductors and switches being similar to that of the corresponding parts of the distributing system, resistances connected with said conductors and located in positions corresponding to those of the consumers in the distributing system, a second representation of the power distributing system, said second representation comprising line tracings corresponding to the several portions of the distributing system, separate indicating apparatus associated with individual portions of said line tracings, actuating devices associated with different portions of the conductors of said first representation and energized whenever the respective portions carry current, and operative connections from each of said indicating apparatus to the actuating device associated with the corresponding portion of the conductors of said first representation.

2. Apparatus for the supervision of electric power distributing systems, comprising a first representation of such system, said representation comprising a source of electricity, electric conductors connected therewith, switches connected with said conductors, the relative arrangement of said conductors and switches being similar to that of the corresponding parts of the distributing system, resistances connected with said conductors and located in positions corresponding to those of the consumers in the distributing system, a second representation of the power distributing system, said second representation comprising line tracings corresponding to the several portions of the distributing system, electric lamps associated with individual portions of said line tracings, relays associated with different portions of the conductors of said first representation and energized whenever the respective portions carry current, and operative connections from said relays to the electric lamps associated with the corresponding portions of said line tracings.

In testimony whereof I affix my signature.

MANFRED SCHLEICHER.